(12) United States Patent
Beebe et al.

(10) Patent No.: US 6,476,323 B2
(45) Date of Patent: Nov. 5, 2002

(54) RIGIDIZED PROTECTIVE SLEEVING

(75) Inventors: Joyce E. Beebe, Glenmoore, PA (US);
Paul J. Matte, Chester Springs, PA (US)

(73) Assignee: Federal-Mogul Systems Protection Group, Inc., Exton, PA (US)

(*) Notice: Subject to any disclaimer, the term of this patent is extended or adjusted under 35 U.S.C. 154(b) by 0 days.

(21) Appl. No.: 10/083,238

(22) Filed: Feb. 26, 2002

(65) Prior Publication Data
US 2002/0117321 A1 Aug. 29, 2002

Related U.S. Application Data
(60) Provisional application No. 60/271,501, filed on Feb. 26, 2001.

(51) Int. Cl.[7] ................................................ H02G 3/04
(52) U.S. Cl. ...................... 174/72 A; 174/68.3; 174/97; 174/136; 138/156; 385/100
(58) Field of Search ................... 174/68.1, 68.3, 174/96, 97, 98, 99 R, 100, 101, 136; 138/108, 113, 151, 156, 174; 385/100, 134

(56) References Cited

U.S. PATENT DOCUMENTS

| 3,582,532 A | | 6/1971 | Plummer | 174/36 |
| 3,825,672 A | * | 7/1974 | Malon et al. | 174/97 |
| 4,409,427 A | | 10/1983 | Plummer, III | 174/36 |
| 4,461,076 A | | 7/1984 | Plummer, III | 29/825 |
| 4,530,865 A | * | 7/1985 | Sprenger | 138/111 |
| 4,862,922 A | | 9/1989 | Kite, III | 138/119 |
| 4,939,819 A | | 7/1990 | Moyer | 24/16 R |
| 5,180,885 A | * | 1/1993 | Shah | 156/54 |
| 5,665,936 A | * | 9/1997 | Sawamura et al. | 174/27 |
| 5,814,767 A | * | 9/1998 | Katz | 174/68.1 |
| 5,901,756 A | * | 5/1999 | Goodrich | 138/110 |
| 6,215,068 B1 | * | 4/2001 | Meier | 174/68.1 |
| 6,256,938 B1 | | 7/2001 | Daton-Lovett | 52/108 |
| 6,332,479 B1 | * | 12/2001 | Ko | 138/108 |

* cited by examiner

Primary Examiner—Dean A. Reichard
Assistant Examiner—Adolfo Nino
(74) Attorney, Agent, or Firm—Synnestvedt & Lechner LLP

(57) ABSTRACT

Rigidized sleeving for protecting elongated items is disclosed. The sleeving is formed from an open mesh of interlaced filamentary members having flexible edge portions extending along the length of the sleeving. A stiffening matrix is attached to the mesh between the edge portions. The edge portions fold towards one another in an overlapping arrangement to create an inner space between the matrix and the edge portions where the elongated items are retained. The matrix has grooves or projections arranged lengthwise along the sleeving and designed to receive and retain the elongated items. Clips attach the sleeving to an external structure. Hook-and-loop fasteners retain the edge portions in overlapping interengagement.

18 Claims, 2 Drawing Sheets

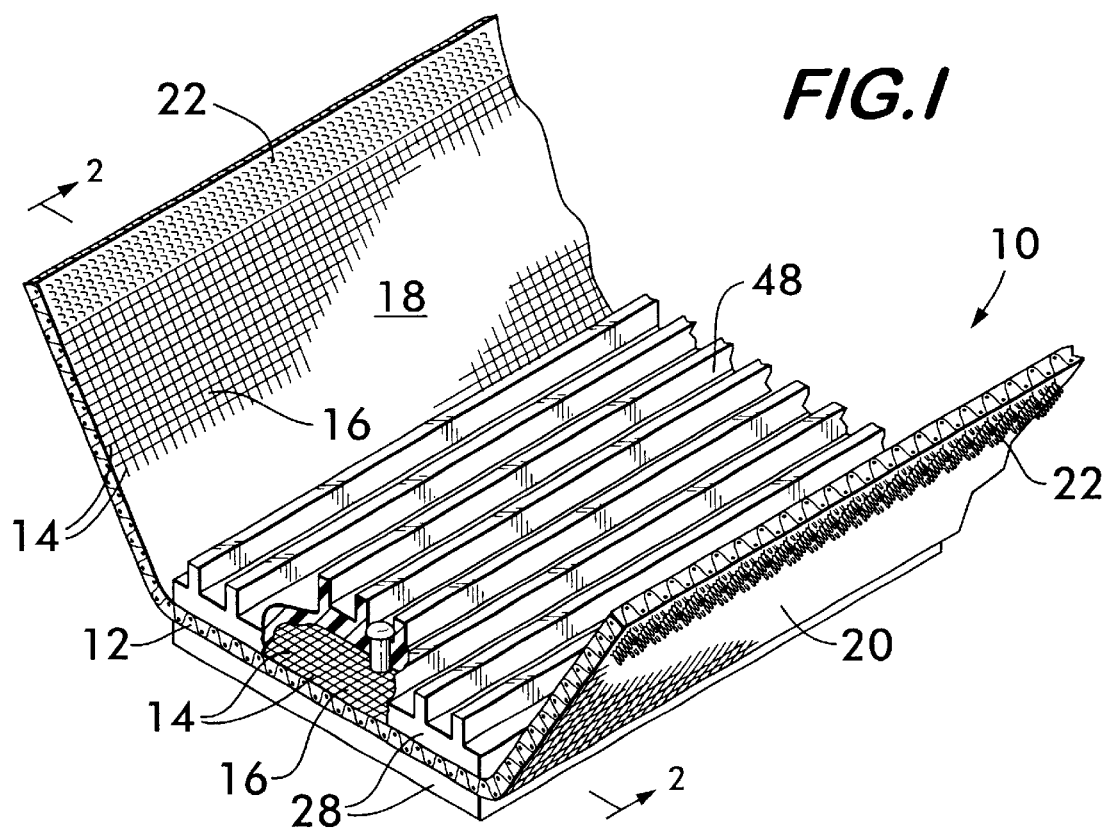
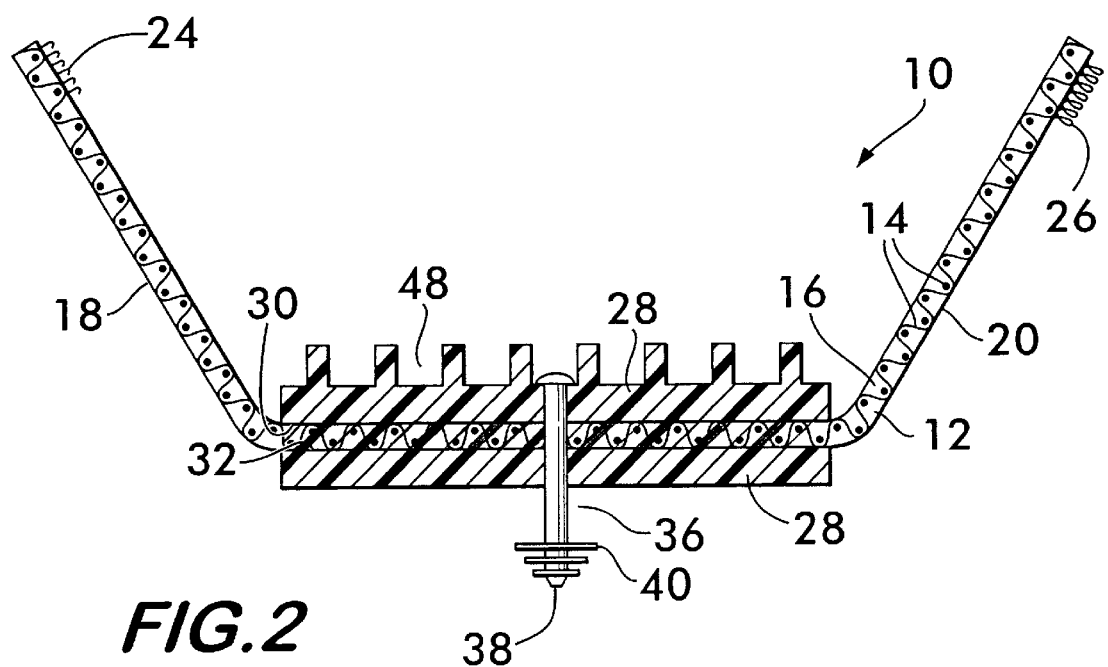

RIGIDIZED PROTECTIVE SLEEVING

RELATED APPLICATION

This application is based on and claims priority U.S. Provisional Application No. 60/271,501, filed Feb. 26, 2001.

FIELD OF THE INVENTION

This invention concerns sleeving for protecting elongated items such as electrical wiring harnesses, conduit and optical fiber strands from damage due to abrasion, shock, impact, heat and chemical exposure.

BACKGROUND OF THE INVENTION

Elongated items such as conductive wires for carrying electrical power, control or communication signals, conduits for conducting hydraulic fluid, combustible liquid fuels or compressed gases, as well as optical fibers for transmitting communication signals, are used extensively in automotive, marine, and aerospace applications. Typically, such elongated items must follow tortuous paths and extend through regions, such as the engine compartment of an automobile, where they are exposed to harsh environmental conditions such as high ambient temperatures, radiant heat, corrosive liquids and gases, intense and continuous vibration (causing abrasion), as well as shock and impact damage.

It is advantageous to bundle such elongated items in sleeving which protects the items from the harsh environment and allows them to be conveniently supported throughout the vehicle and attached to the vehicle structure at a plurality of points. Elongated molded plastic channels having attachment clips spaced at intervals along the channel provide one example of protective sleeving currently in use. Flexible, resilient flap portions overlay the channel trough to removably retain wiring or other elongated items within the channel. Such channels have the stiffness necessary to adequately support their contents and can provide protection against the environment as required.

Unfortunately, such channels tend to be too stiff and have difficulty conforming to convenient pathways through the vehicle which may have multiple compound curves or curves with relatively small radii. It is further difficult to expose a significant length of the wire or optical fiber bundles in such molded channels when constructing a wiring harness or effecting a repair or a splice because the flap portions tend to be molded or biased into the closed position and must be continuously held open over their length to expose any significant portion of the items held within. Furthermore, the channels have a predetermined size which is optimized for a particular size bundle of elongated object. If too few items are held within a channel, the items will not be securely retained and will have room to vibrate and abrade against each other, possibly causing failures in a vital system served by the wires, conduits or optical fibers within the channel.

There is clearly a need for a protective sleeve which can provide adequate support and protection to a bundle of elongated items but which also allows for relatively greater ease of use, conformability to a desired pathway and greater versatility in the size and number of elongated items which may be secured within the sleeve.

SUMMARY OF THE INVENTION

The invention concerns rigidized sleeving for protecting elongated items. The term "rigidized sleeving" refers to otherwise flexible sleeving that is reinforced to provide increased stiffness enabling the sleeving to adequately support the elongated items and yet remain relatively conformable so as to follow a pathway having compound curves and bends with small radii.

The sleeving preferably comprises a flexible, elongated substrate formed of interlaced, flexible, resilient filamentary members. The substrate has oppositely positioned, flexible edge portions extending along its length. Fastening means are positioned along each of the edge portions, the fastening means cooperating to attach the edge portions together to form the sleeving.

The sleeving also has a relatively rigid, elongated matrix attached lengthwise along the substrate between the flexible edge portions. This matrix serves as a backbone which rigidizes the sleeve. The edge portions are positionable in overlying relation with the matrix and attachable to one another with the aforementioned fastening means to form an interior space between the matrix and the edge portions for receiving the elongated items. Preferably, the edge portions are dimensioned to overlap one another when in overlying relationship with said matrix to allow for the use of hook and loop type fasteners to secure the edge portions to one another.

Preferably, the matrix comprises a plastic resin extruded onto or with the substrate. A plurality of grooves are arranged lengthwise along a surface of the matrix positioned within interior space. The grooves provide spaces which receive and hold the elongated items. Alternately, the sleeving may have a plurality of projections which extend outwardly from the surface, the projections being arranged in spaced apart relation to each other and extending lengthwise along the matrix to accommodate the lengthwise items between them. To retain the items between the projections, the projections have a particular cross sectional shape, such as a T shape or a triangular shape.

Preferably, the filamentary members of the substrate are interlaced by weaving in a relatively open weave and the matrix is integrally formed on both sides of the substrate by extruding a plastic resin with or onto it.

BRIEF DESCRIPTION OF THE DRAWINGS

FIG. 1 is a perspective view of a portion of rigidized protective sleeving according to the invention;

FIG. 2 is a cross-sectional view taken along lines 2—2 of FIG. 1;

DETAILED DESCRIPTION OF THE PRESENTLY PREFERRED EMBODIMENTS

Figure 6:
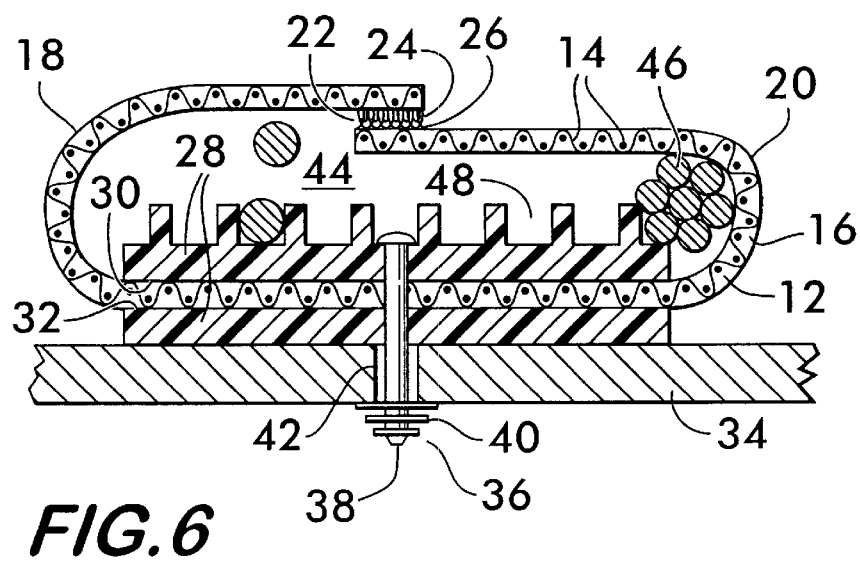
FIG. 6 is a cross-sectional view of the sleeving shown in FIG. 1 in use.

FIG. 1 shows a perspective view of a length of rigidized sleeving 10 according to the invention. Sleeving 10 comprises a flexible elongated substrate 12 formed of flexible, resilient, interlaced filamentary members 14, preferably woven in a relatively open mesh 16, although closed meshes are also feasible. Substrate 12 has flexible edge portions 18 and 20 arranged on opposite sides of the sleeving and extending lengthwise along it. Preferably, edge portions 18 and 20 are similarly woven of filamentary members 14 in a mesh 16. Fastening means 22, preferably in the form of interengagable hooks 24 and loops 26 (shown in FIG. 2), are positioned lengthwise along each of the edge portions 18 and 20. The fastening means cooperate to attach the edge portions together as shown in FIG. 6. Other fastening means, such as snap fasteners, pressure sensitive adhesive strips, lacing, buttons, zippers and the like, are also feasible.

Preferably, the filamentary members 14 comprise synthetic polymer monofilaments from the family of engineered plastics. Engineered plastics, referred to herein, include plastics that have a tensile modulus greater than 50,000 psi and in the range of about 50,000 to about 200,000 psi. Polyester material is particularly favored in automotive applications in view of its relatively good abrasion resistance, hightensile strength, resistance to chemical attack and ability to sustain relatively high operating temperatures (on the order of 125° C.) without softening or exhibiting creep. Other engineered plastics materials, such as olefin polymers, may also be used.

A relatively rigid, elongated matrix 28 is attached lengthwise along the substrate 12 between the flexible edge portions 18 and 20. The matrix is preferably a thermoplastic material, with polyester being most preferred due to its resistance to abrasion and ability to withstand relatively high ambient temperatures. Other materials such as nylon, as well as polyolefins such as polyethylene or polypropylene, are also feasible.

Figure 3:
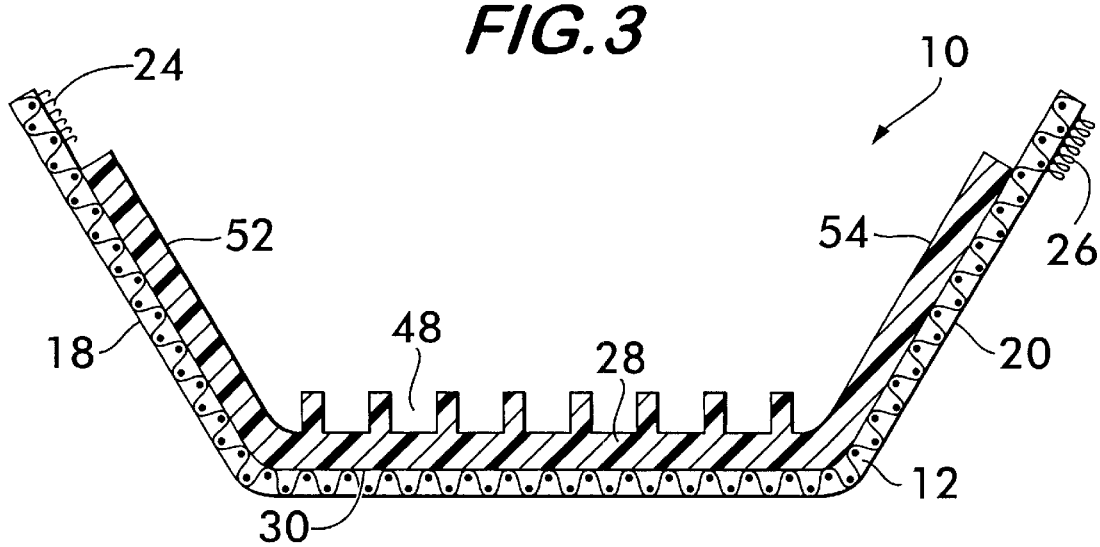
FIG. 3 is a cross-sectional view of an alternate embodiment of the sleeving.

Preferably, the matrix 28 is extruded onto one or both sides of the substrate using film or sheet dies. The substrate is then passed between rollers to embed the substrate within the matrix material. Open meshes 16 are preferred to facilitate interpenetration of the matrix through the substrate and thereby provide good adhesion between the components. The matrix 28 may also be adhesively bonded to the substrate 12 and positioned on both substrate surfaces 30 and 32, as shown in FIG. 6, or only on one surface 30, as shown in FIG. 3. Matrix 28 is relatively rigid as compared with the substrate 12 and provides the rigidizing qualities which stiffen the sleeving and allow it to support and protect a wire bundle or other elongated items as a load bearing member. The matrix is, however, flexible enough to bend and twist to allow the sleeving to conform as needed throughout the automobile to conveniently conduct the wires and/or other elongated items between the locations where they are needed. Part of this conformability of the sleeving is due to the fact that the matrix is relatively planar and does not have a significant cross-sectional area moment of inertia like a molded channel would have. While the edge portions 18 and 20 serve to retain the elongated items, such as the wiring within the sleeving, they do not contribute significantly to its overall stiffness.

To facilitate attachment of the sleeving 10 to other structures, such as an automobile chassis 34 or body component (see FIG. 6), the matrix 28 has a plurality of clips 36 spaced at convenient intervals along the length of the sleeving. One form of clip 36, shown in detail in FIG. 2, comprises a projection 38 extending from the matrix 28, the projection having flexible, outwardly extending elements 40 which are designed to engage holes 42 in the chassis 34 or other structure and removably retain the sleeving thereto. Other forms of clips are also feasible, for example, clips having split projecting members with flexible barbs extending from them.

As further shown in FIG. 6, the edge portions 18 and 20 are flexibly positionable in overlying relation with the matrix 28 to form an interior space 44 between themselves and the matrix for receiving elongated items 46 to be protected and supported by the sleeving 10. Preferably, edge portions 18 and 20 are dimensioned so as to overlap one another so that the fastening means 22 on each edge portion may cooperate to secure the edge portions to each other.

To further secure the elongated items within the sleeving 10, the matrix 28 preferably has a plurality of grooves 48 arranged lengthwise along the sleeving facing the interior space 44. The grooves may be sized so as to accept individual elongated items 46 between them in order to isolate the items from each other and prevent abrasion in a vibratory environment. Alternately, the grooves may accept multiple items.

Relatively simple grooves are preferably formed by patterned rollers which imprint the grooves into the matrix surface as it passes between them after the matrix is extruded. As shown in detail in FIGS. 4 and 5, grooves 48 may also be formed by a plurality of projections 50 extending outwardly from the matrix 28 and arranged in spaced apart relation lengthwise along it. Projections 50 have cross-sectional shapes, such as the T shape seen in FIG. 4, or the inverted triangle shape shown in FIG. 5, which engage the elongated items 46 and retain them to the matrix.

Figures 4, 5:
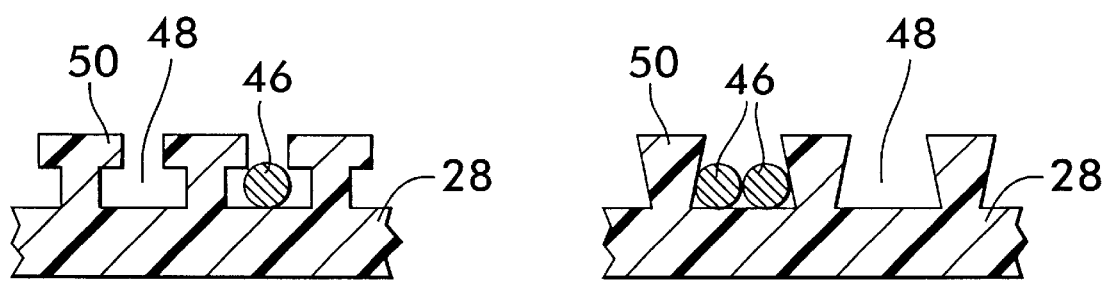
FIGS. 4 and 5 are partial cross-sectional views illustrating alternate design details of the sleeving shown in FIGS. 1 and 2.

As shown in FIG. 4, the base of the T-shaped projection 50 is attached to the matrix 28. Projection 50 is resiliently flexible, allowing the projections to be deflected away from one another to permit an elongated item 46 to be inserted between adjacent projections, the projections resiliently returning to their undeformed shape. The T shape of the projection facilitates capture of elongated item 46 between the surface of matrix 28 and the top of the T.

FIG. 5 shows projections 50 having a triangular cross-sectional shape, the triangle being inverted with an apex of the triangle attached to the matrix 28. The triangular projections are resiliently flexible and deflectable to permit elongated items 46 to be inserted between adjacent projections, and the triangular shape facilitates capture and retention of the items 46 to the surface of matrix 28.

In an alternate embodiment shown in FIG. 3, flexible edge portions 18 and 20 are coated, preferably on one side, with thermoplastic layers 52 and 54, respectively, of the same material from which matrix 28 is formed. Layers 52 and 54 preferably extend from matrix 28 and substantially cover their respective edge portions 18 and 20 to provide some increased stiffness to the edge portions. The layers may be molded or otherwise set or resiliently biased into a particular shape, which may, for example, be a closed shape (as shown in FIG. 6) to facilitate closure of the sleeving upon use, or an open shape, as shown in FIG. 3, to provide ready access to the interior space 44, and yet allow the edge portions 18 and 20 to be ready at hand for quick and convenient closure once the desired elongated items are in place.

The rigidized sleeving according to the invention promises to provide a protective covering for elongated items which exhibits the flexibility advantages associated with woven, knitted or braided protective sleeving, combined with the stiffness characteristics of molded channel sleeving to produce sleeving which is more flexible and, thus, more conformable than molded plastic channel and yet stiffer and, thus, able to provide more support than the woven, knitted or braided sleeving.

What is claimed is:

1. Rigidized sleeving for protecting elongated items, said sleeving comprising:

a flexible, elongated substrate formed of interlaced, flexible, resilient filamentary members, said substrate having oppositely positioned flexible edge portions extending lengthwise therealong;

fastening means positioned along each of said edge portions, said fastening means cooperating to attach said edge portions together to form said sleeving; and a relatively rigid, elongated matrix attached lengthwise along said substrate between said flexible edge portions, said edge portions being positionable in overlying relation with said matrix and attachable to one another with said fastening means to form an interior space between said matrix and said edge portions for receiving said elongated items.

2. Rigidized sleeving according to claim 1, wherein said edge portions are dimensioned to overlap one another when in said overlying relationship with said matrix.

3. Rigidized sleeving according to claim 2, wherein said fastening means comprises interengagable hooks and loops, said hooks being positioned lengthwise along one of said flexible edge portions, said loops being positioned lengthwise along the other of said flexible edge portions.

4. Rigidized sleeving according to claim 1, wherein said matrix is attached to one surface of said substrate.

5. Rigidized sleeving according to claim 1, wherein said filamentary members are interlaced by weaving.

6. Rigidized sleeving according to claim 5, wherein said matrix comprises a plastic resin extruded onto said substrate.

7. Rigidized sleeving according to claim 1, wherein said matrix has a surface positioned within said interior space, said surface having a plurality of grooves arranged lengthwise therealong, said grooves each being dimensioned to receive at least one of said elongated items.

8. Rigidized sleeving according to claim 1, wherein said matrix has opposing surfaces oriented substantially parallel with said substrate, said substrate being positioned between said surfaces.

9. Rigidized sleeving according to claim 8, wherein said substrate is embedded within said matrix.

10. Rigidized sleeving according to claim 9, wherein said filamentary members are interlaced in a relatively open mesh so as to readily accept interpenetration of said matrix and said substrate.

11. Rigidized sleeving according to claim 8, wherein said matrix comprises first and second matrix portions arranged on opposite sides of said substrate, said matrix portions being attached to said substrate and capturing it therebetween.

12. Rigidized sleeving according to claim 9, wherein said matrix comprises a plastic resin.

13. Rigidized sleeving according to claim 12, wherein said matrix is extruded integrally with said substrate.

14. Rigidized sleeving according to claim 1, wherein said matrix has a surface substantially co-planar with said substrate, said surface being positioned within said interior space and having a plurality of projections extending outwardly therefrom, said projections being arranged in spaced apart relation to each other and extending lengthwise along said matrix.

15. Rigidized sleeving according to claim 14, wherein said projections have a T-shaped cross section, the base of the T shape being attached to said surface, said projections being resiliently flexible to allow them to be deflected away from one another so as to permit an elongated item to be inserted between adjacent projections, said projections resiliently returning to an undeflected position so as to capture said elongated item between said surface and the top of said T shape.

16. Rigidized sleeving according to claim 14, wherein said projections have a triangular cross-sectional shape with an apex of the triangle being attached to said surface, said projections being resiliently flexible to allow said projections to be deflected away from one another so as to permit an elongated item to be inserted between adjacent projections, said projections resiliently returning to an undeflected position so as to capture said elongated item between said surface and said adjacent projections, said triangular cross section facilitating said capture.

17. Rigidized sleeving according to claim 1, wherein said matrix has a plurality of clips arranged in spaced apart relation lengthwise therealong and outside of said interior space, said clips extending outwardly from said matrix for attaching said sleeving to a supporting structure.

18. Rigidized sleeving according to claim 1, wherein one of said edge portions has a plastic resin coating formed thereon.

* * * * *